(12) United States Patent
Takano et al.

(10) Patent No.: US 10,161,478 B2
(45) Date of Patent: Dec. 25, 2018

(54) DRIVING DEVICE, FIXING DEVICE AND IMAGE FORMING APPARATUS

(71) Applicant: Konica Minolta, Inc., Chiyoda-ku, Tokyo (JP)

(72) Inventors: Masahito Takano, Tokyo (JP); Jun Onishi, Tokyo (JP); Takashi Fujiwara, Tokyo (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 12 days.

(21) Appl. No.: 15/420,177

(22) Filed: Jan. 31, 2017

(65) Prior Publication Data
US 2017/0219049 A1    Aug. 3, 2017

(30) Foreign Application Priority Data
Feb. 3, 2016    (JP) ................. 2016-018816

(51) Int. Cl.
| F16H 1/22 | (2006.01) |
| F16H 35/00 | (2006.01) |
| G03G 15/20 | (2006.01) |
| G03G 21/16 | (2006.01) |

(52) U.S. Cl.
CPC .............. *F16H 1/22* (2013.01); *F16H 35/00* (2013.01); *G03G 15/2053* (2013.01); *G03G 21/1647* (2013.01); *F16H 2035/001* (2013.01); *G03G 2221/1657* (2013.01)

(58) Field of Classification Search
CPC ...... F16H 1/22; F16H 35/00; F16H 2035/001; F16H 57/00; F16H 51/00; G03G 15/2053; B65H 1/00
See application file for complete search history.

(56) References Cited

U.S. PATENT DOCUMENTS

| 2,245,280 A * | 6/1941 | Kammer .................. F01L 5/10 475/14 |
| 2,920,497 A * | 1/1960 | Wiken ...................... F16H 1/22 384/255 |
| 3,289,484 A * | 12/1966 | Archer ................... F16H 35/00 74/18.1 |
| 3,590,313 A * | 6/1971 | Stoke .................... H01J 23/207 315/39.61 |

(Continued)

FOREIGN PATENT DOCUMENTS

JP    2010-041747 A    2/2010

*Primary Examiner* — Zakaria Elahmadi
(74) *Attorney, Agent, or Firm* — Buchanan Ingersoll & Rooney PC

(57) ABSTRACT

A driving device includes: a first driving source; a second driving source; a first gear to which a driving force is transmitted from the first driving source; a second gear to which a driving force is transmitted from the second driving source; a third gear that engages with the first gear and the second gear; and a fixation shaft that pivotally supports the third gear, the fixation shaft being disposed such that a center of the fixation shaft, a rotation center of the first gear and a rotation center of the second gear are disposed on a straight line in which the fixation shaft is provided through the third gear; and a hole having a diameter for compensating eccentricity of the first gear, the second gear and the third gear is formed in the third gear.

14 Claims, 9 Drawing Sheets

(56) References Cited

U.S. PATENT DOCUMENTS

| | | | | |
|---|---|---|---|---|
| 3,732,745 | A * | 5/1973 | Jackson | F16H 1/22 123/90.15 |
| 5,101,678 | A * | 4/1992 | Inui | B60K 17/3505 475/162 |
| 7,784,372 | B1 * | 8/2010 | Chen | A61H 15/0078 601/100 |
| 9,677,401 | B1 * | 6/2017 | Alsubaih | F01C 1/077 |
| 9,706,844 | B2 * | 7/2017 | Sakurai | A47C 1/024 |
| 2009/0019961 | A1 * | 1/2009 | Kobayashi | B25J 9/0009 74/490.06 |
| 2009/0100953 | A1 * | 4/2009 | Chen | F04B 35/01 74/390 |
| 2011/0266990 | A1 * | 11/2011 | Murata | H02K 11/0094 318/400.37 |
| 2012/0075731 | A1 * | 3/2012 | Iikawa | G02B 7/08 359/824 |
| 2014/0256496 | A1 * | 9/2014 | Zhang | F16H 1/46 475/168 |
| 2014/0347712 | A1 * | 11/2014 | Yoneyama | H04N 1/0057 358/498 |

* cited by examiner

DRIVING DEVICE, FIXING DEVICE AND IMAGE FORMING APPARATUS

CROSS REFERENCE TO RELATED APPLICATIONS

This application is entitled to and claims the benefit of Japanese Patent Application No. 2016-018816, filed on Feb. 3, 2016, the disclosure of which including the specification, drawings and abstract is incorporated herein by reference in its entirety.

BACKGROUND OF THE INVENTION

1. Field of the Invention

The present invention relates to a driving device, a fixing device and an image forming apparatus.

2. Description of Related Art

In general, an electrophotographic image forming apparatus (such as a printer, a copy machine, and a fax machine) is configured to irradiate (expose) a charged photoconductor drum (image bearing member) with (to) laser light based on image data to form an electrostatic latent image on the surface of the photoconductor. The electrostatic latent image is then visualized by supplying toner from a developing device to the photoconductor drum on which the electrostatic latent image is formed, whereby a toner image is formed. Further, the toner image is directly or indirectly transferred to a sheet, and then heat and pressure are applied to the sheet at a fixing nip to form a toner image on the sheet.

Incidentally, for example, speedup of image forming apparatuses for production print markets has been increasingly advanced, and in particular, high output of the driving source (for example, a direct current (DC) motor) for driving the fixing roller in the fixing section is desired. Generally, such a driving source is specifically designed in accordance with the required output, and tends to be a dedicated product. This has resulted in imbalance between the design cost including the metal mold for the driving source and the production volume appropriate to the cost, and therefore reduction of production cost is an urgent necessity.

In addition, a stepping motor for highly accurate positioning is used as the driving source used for sheet conveyance. However, when the output of the stepping motor is increased in the case where the output is further increased to achieve printing of thick sheets and high-speed sheet conveyance, the inertia of the stepping motor is increased, and this makes it difficult to achieve highly accurate positioning. When a DC motor is used for the driving source to achieve high output, the positioning accuracy comparable to that of the stepping motor has to be ensured, and in view of this, there is room for improvement in achieving high output of the driving source.

To achieve high output of the driving source, Japanese Patent Application Laid-Open No. 2010-41747 discloses a driving device which achieves high output by use of a plurality of driving sources, for example. FIG. 1 illustrates a gear mechanism in the driving device using two driving sources M1 and M2.

For example, as illustrated in FIG. 1, in the case of the configuration for achieving high output by use of two driving sources M1 and M2, first driving gear G1 and second driving gear G2 connected with two shafts X1 and X2 of driving sources M1 and M2 engage with idle gear G3, and the driving force is transmitted to idle gear G3 from two driving sources M1 and M2. In this manner, idle gear G3 can output the driving force of the sum of the driving forces of two driving sources M1 and M2.

In some situation, a gear eccentrically moves along an ellipse path, not a perfect circle. The eccentricity of a gear is caused by, for example, a positional shift between the drive shaft of the driving source and the rotation center of the driving source, inclination of the drive shaft of the driving source, shift between the fixation position of a shaft that pivotally supports the gear and the rotation center of the gear, inclination of the shaft that pivotally supports the gear, shift between the position of the center of the shaft hole of the gear and the rotation center of the gear, inclination of the shaft hole of the gear, and the like.

In the configuration disclosed in Japanese Patent Application Laid-Open No. 2010-41747, in the case where the gears have no eccentricity, the engagement positions of the gears are not varied and the torques generated at the engagement portions of the driving gears and the idle gear are constant. In contrast, in the case where at least one of the gears has eccentricity, the engagement positions of the gears and the idle gear are varied and the torques generated at the engagement portions of the driving gears and the idle gear are not constant.

For example, in the configuration of FIG. 1, in the case where only second driving gear G2 has eccentricity, the engagement position of second driving gear G2 and idle gear G3 is vertically varied under the influence of the eccentricity of second driving gear G2. When the position is varied, torque B generated at the engagement portion of second driving gear G2 and idle gear G3 is varied depending on the position of second driving gear G2.

In addition, in the configuration of FIG. 1 where a plurality of driving gears are engaged with the idle gear, to keep the rotational speed constant, the driving sources operate to keep the total torque generated at the engagement portions of the gears constant. Therefore, when torque B is varied, torque A generated at the engagement portion of first driving gear G1 and idle gear G3 is also varied. FIG. 1 illustrates an example case where second driving gear G2 is located at a position where torque B is greater than torque A.

As described, in the configuration disclosed in Japanese Patent Application Laid-Open No. 2010-41747, the eccentricity sensitivity of the gears is high, and, when the gears have eccentricity, the balance of the torques at the engagement portions of the gears is poor, and consequently, the output of the idle gear may possibly be varied.

To be more specific, for example, in the case where the two driving sources are of the same type (for example, DC motors) in the configuration of FIG. 1, the output of idle gear G3 may become insufficient depending on the position of the gear having eccentricity. In addition, in the case where one of the driving sources is composed of a stepping motor and the other is composed of a DC motor, an excessive load is applied to the stepping motor side depending on the position of the gear having eccentricity, and in turn, loss of synchronization of the stepping motor may possibly result.

SUMMARY OF THE INVENTION

An object of the embodiment of the present invention is to provide a driving device which can achieve high output by suppressing variation of the output even when a gear has eccentricity, and a fixing device and an image forming apparatus including the driving device.

To achieve the abovementioned object, a driving device reflecting one aspect of the embodiment of the present invention includes: a first driving source; a second driving source; a first gear to which a driving force is transmitted from the first driving source; a second gear to which a driving force is transmitted from the second driving source; a third gear that engages with the first gear and the second gear; and a fixation shaft that pivotally supports the third gear, the fixation shaft being disposed such that a center of the fixation shaft, a rotation center of the first gear and a rotation center of the second gear are disposed on a straight line. The fixation shaft is provided through the third gear; and a hole having a diameter for compensating eccentricities of the first gear, the second gear and the third gear is formed in the third gear.

Desirably, in the driving device, the diameter of the hole is set based on eccentric quantities of the first gear, the second gear and the third gear.

Desirably, in the driving device, the third gear is disposed such that a direction of a torque which is exerted on the third gear from a load that transmits a driving force is orthogonal to directions of torques which are exerted on the third gear from the first gear and the second gear.

Desirably, in the driving device, the third gear transmits a driving force to a load through a coupling member.

Desirably, in the driving device, the first driving source and the second driving source are DC motors.

Desirably, in the driving device, one of the first driving source and the second driving source is a DC motor; and the other of the first driving source and the second driving source is a stepping motor.

To achieve the abovementioned object, a fixing device reflecting one aspect of the embodiment of the present invention includes: a first driving source; a second driving source; a first gear to which a driving force is transmitted from the first driving source; a second gear to which a driving force is transmitted from the second driving source; a third gear that engages with the first gear and the second gear; and a fixation shaft that pivotally supports the third gear, the fixation shaft being disposed such that a center of the fixation shaft, a rotation center of the first gear and a rotation center of the second gear are disposed on a straight line. The fixation shaft is provided through the third gear; and a hole having a diameter for compensating eccentricity of the first gear, the second gear and the third gear is formed in the third gear.

To achieve the abovementioned object, an image forming apparatus reflecting one aspect of the embodiment of the present invention includes: a first driving source; a second driving source; a first gear to which a driving force is transmitted from the first driving source; a second gear to which a driving force is transmitted from the second driving source; a third gear that engages with the first gear and the second gear; and a fixation shaft that pivotally supports the third gear, the fixation shaft being disposed such that a center of the fixation shaft, a rotation center of the first gear and a rotation center of the second gear are disposed on a straight line. The fixation shaft is provided through the third gear; and a hole having a diameter for compensating eccentricity of the first gear, the second gear and the third gear is formed in the third gear.

DESCRIPTION OF THE PREFERRED EMBODIMENTS

Figure 2:
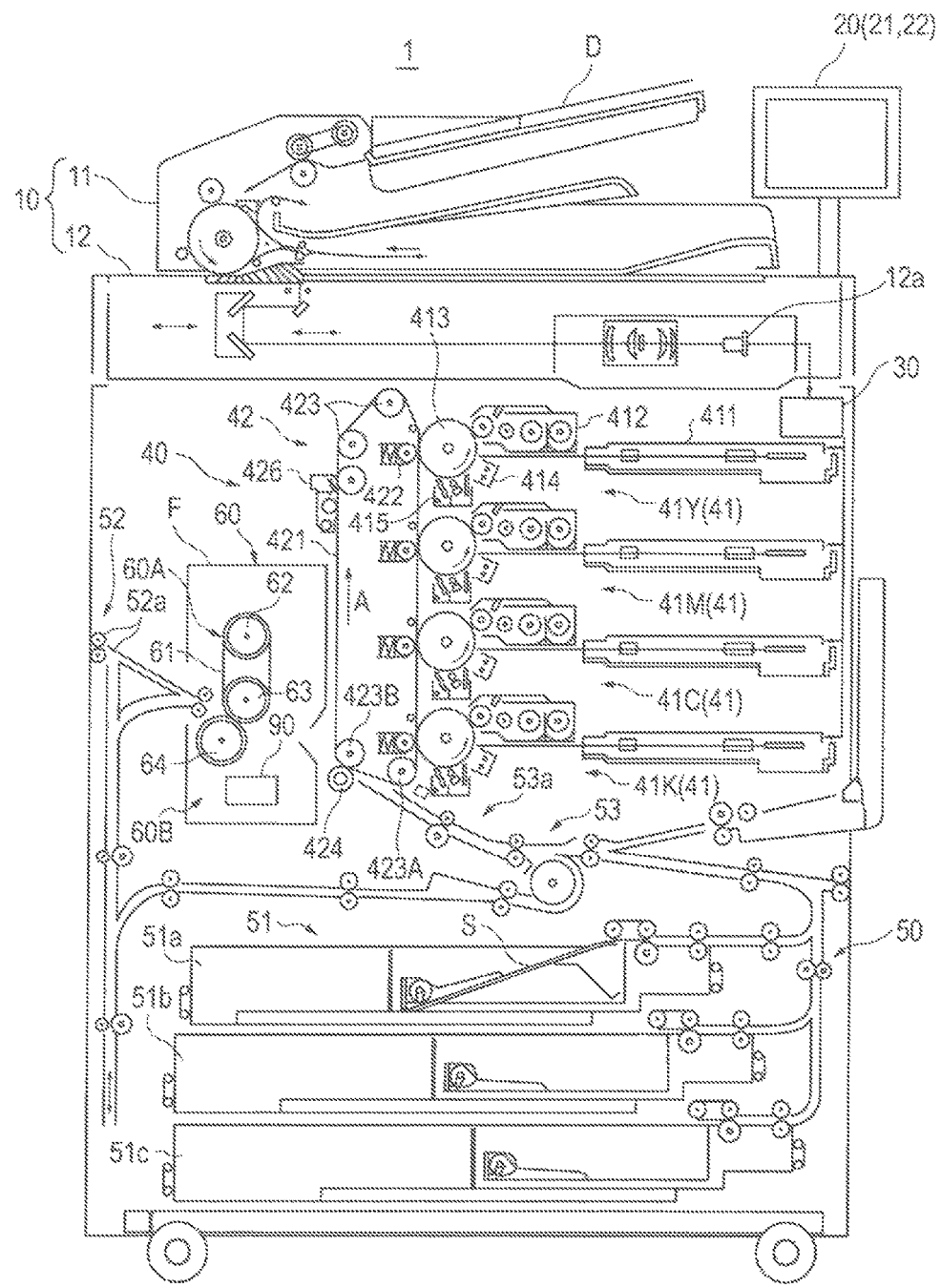
FIG. 2 schematically illustrates a general configuration of the image forming apparatus according to an embodiment.
Figure 3:
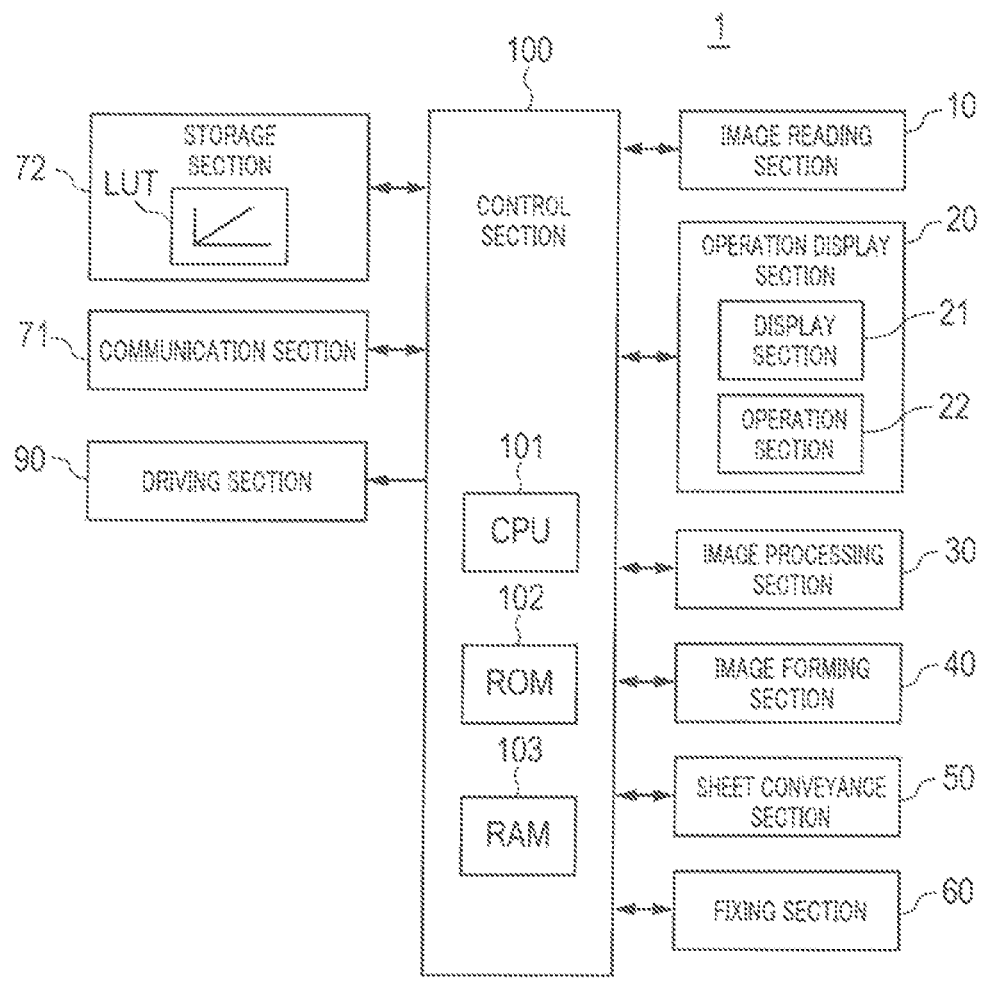
FIG. 3 illustrates a principal part of a control system of the image forming apparatus according to the embodiment.

In the following, the present embodiment is described in detail with reference to the drawings. FIG. 2 illustrates an overall configuration of image forming apparatus 1 according to the present embodiment. FIG. 3 illustrates a principal part of a control system of image forming apparatus 1 according to the embodiment.

Image forming apparatus 1 illustrated in FIGS. 2 and 3 is a color image forming apparatus of an intermediate transfer system using electrophotographic process technology. That is, image forming apparatus 1 transfers (primary-transfers) toner images of yellow (Y), magenta (M), cyan (C), and black (K) formed on photoconductor drums 413 to intermediate transfer belt 421, and superimposes the toner images of the four colors on one another on intermediate transfer belt 421. Then, image forming system 1 secondary-transfers the resultant image to sheet S, thereby forming an image.

A longitudinal tandem system is adopted for image forming apparatus 1. In the longitudinal tandem system, respective photoconductor drums 413 corresponding to the four colors of YMCK are placed in series in the travelling direction (vertical direction) of intermediate transfer belt 421, and the toner images of the four colors are sequentially transferred to intermediate transfer belt 421 in one cycle.

Image forming apparatus 1 includes image reading section 10, operation display section 20, image processing section 30, image forming section 40, sheet conveyance section 50, fixing section 60, driving section 90 and control section 100.

Control section 100 includes central processing unit (CPU) 101, read only memory (ROM) 102, random access memory (RAM) 103 and the like. CPU 101 reads a program suited to processing contents out of ROM 102, develops the program in RAM 103, and integrally controls an operation of each block of image forming apparatus 1 in cooperation with the developed program. At this time, CPU 101 refers to various kinds of data stored in storage section 72. Storage section 72 is composed of, for example, a non-volatile semiconductor memory (so-called flash memory) or a hard disk drive.

Control section 100 transmits and receives various data to and from an external apparatus (for example, a personal computer) connected to a communication network such as a local area network (LAN) or a wide area network (WAN), through communication section 71. Control section 100 receives, for example, image data (input image data) transmitted from the external apparatus, and performs control to form an image on sheet S on the basis of the image data.

Communication section 71 is composed of, for example, a communication control card such as a LAN card.

Image reading section 10 includes auto document feeder (ADF) 11, document image scanning device 12 (scanner), and the like.

Auto document feeder 11 causes a conveyance mechanism to feed document D placed on a document tray, and sends out document D to document image scanner 12. Auto document feeder 11 enables images (even both sides thereof) of a large number of documents D placed on the document tray to be successively read at once.

Document image scanner 12 optically scans a document fed from auto document feeder 11 to its contact glass or a document placed on its contact glass, and brings light reflected from the document into an image on the light receiving surface of charge coupled device (CCD) sensor 12a, to thereby read the document image. Image reading section 10 generates input image data on the basis of a reading result provided by document image scanner 12. Image processing section 30 performs predetermined image processing on the input image data.

Operation display section 20 includes, for example, a liquid crystal display (LCD) provided with a touch panel, and functions as display section 21 and operation section 22. Display section 21 displays various operation screens, image conditions, operating statuses of functions, and the like in accordance with display control signals received from control section 100. Operation section 22 includes various operation keys such as numeric keys and a start key, receives various input operations performed by a user, and outputs operation signals to control section 100.

Image processing section 30 includes a circuit that performs a digital image process suited to initial settings or user settings on the input image data, and the like. For example, image processing section 30 performs tone correction on the basis of tone correction data (tone correction table), under the control of control section 100. In addition to the tone correction, image processing section 30 also performs various correction processes such as color correction and shading correction as well as a compression process, on the input image data. Image forming section 40 is controlled on the basis of the image data that has been subjected to these processes.

Image forming section 40 includes: image forming units 41Y, 41M, 41C, and 41K that form images of colored toners of a Y component, an M component, a C component, and a K component on the basis of the input image data; intermediate transfer unit 42; and the like.

Figure 1:
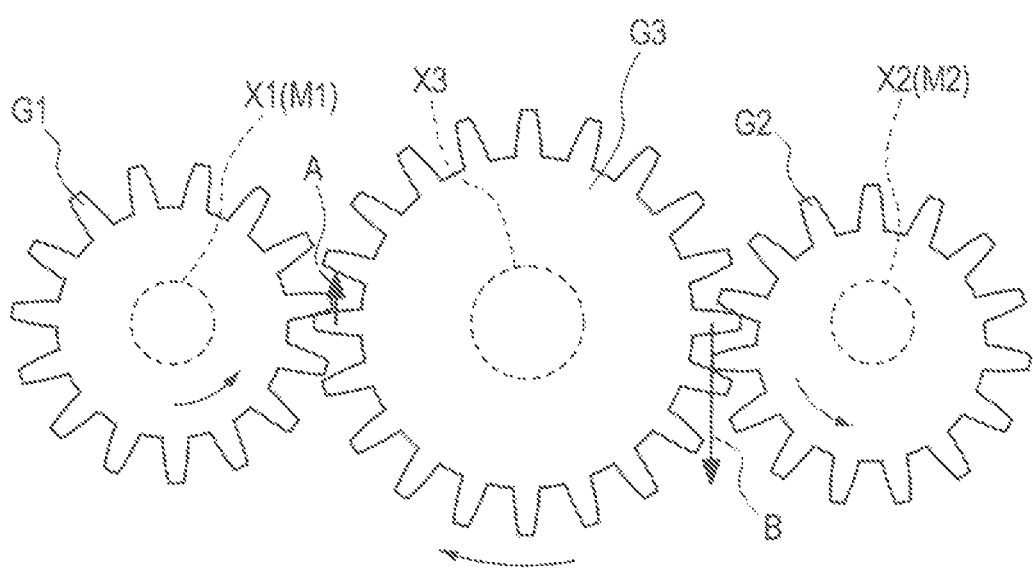
FIG. 1 illustrates a gear mechanism in a driving device using two driving sources.

Image forming units 41Y, 41M, 41C, and 41K for the Y component, the M component, the C component, and the K component have similar configurations. For ease of illustration and description, common elements are denoted by the same reference signs. Only when elements need to be discriminated from one another, Y, M, C, or K is added to their reference signs. In FIG. 1, reference signs are given to only the elements of image forming unit 41Y for the Y component, and reference signs are omitted for the elements of other image forming units 41M, 41C, and 41K.

Image forming unit 41 includes exposing device 411, developing device 412, photoconductor drum 413, charging device 414, drum cleaning device 415 and the like.

Photoconductor drum 413 is a negative-charging type organic photoconductor (OPC) having photoconductivity in which an undercoat layer (UCL), a charge generation layer (CGL), and charge transport layer (CTL) are sequentially stacked on a peripheral surface of a conductive cylindrical body made of aluminum (aluminum raw pipe), for example.

Charging device 414 causes corona discharge to evenly negatively charge the surface of photoconductor drum 413 having photoconductivity.

Exposure device 411 is composed of, for example, a semiconductor laser, and configured to irradiate photoconductor drum 413 with laser light corresponding to the image of each color component. The positive charge is generated in the charge generation layer of photoconductor drum 413 and is transported to the surface of the charge transport layer, whereby the surface charge (negative charge) of photoconductor drum 413 is neutralized. An electrostatic latent image of each color component is formed on the surface of photoconductor drum 413 by the potential difference from its surroundings.

Developing device 412 is a developing device of a two-component reverse type, and attaches toners of respective color components to the surface of photoconductor drums 413, and visualizes the electrostatic latent image to form a toner image. Developing device 412 forms a toner image on the surface of photoconductor drum 413 by supplying the toner included in the developer to photoconductor drum 413.

Drum cleaning device 415 includes a drum cleaning blade that is brought into sliding contact with the surface of photoconductor drum 413, and removes residual toner that remains on the surface of photoconductor drum 413 after the primary transfer.

Intermediate transfer unit 42 includes intermediate transfer belt 421, primary transfer roller 422, a plurality of support rollers 423, secondary transfer roller 424, belt cleaning device 426 and the like.

Intermediate transfer belt 421 is composed of an endless belt, and is stretched around the plurality of support rollers 423 in a loop form. At least one of the plurality of support rollers 423 is composed of a driving roller, and the others are each composed of a driven roller. When driving roller rotates, intermediate transfer belt 421 travels in direction A at a constant speed. Intermediate transfer belt 421 is a conductive and elastic belt, and is driven into rotation with a control signal from control section 100.

Primary transfer rollers 422 are disposed on the inner periphery side of intermediate transfer belt 421 to face photoconductor drums 413 of respective color components. Primary transfer rollers 422 are brought into pressure contact with photoconductor drums 413 with intermediate transfer belt 421 therebetween, whereby a primary transfer nip for transferring a toner image from photoconductor drums 413 to intermediate transfer belt 421 is formed.

Secondary transfer roller 424 is disposed to face backup roller 423B disposed on the downstream side in the belt travelling direction relative to driving roller 423A, at a position on the outer peripheral surface side of intermediate transfer belt 421. Secondary transfer roller 424 is brought into pressure contact with backup roller 423B with intermediate transfer belt 421 therebetween, whereby a secondary transfer nip for transferring a toner image from intermediate transfer belt 421 to sheet S is formed.

Belt cleaning device 426 removes transfer residual toner which remains on the surface of intermediate transfer belt 421 after a secondary transfer.

When intermediate transfer belt 421 passes through the primary transfer nip, the toner images on photoconductor drums 413 are sequentially primary-transferred to intermediate transfer belt 421. To be more specific, a primary transfer bias is applied to primary transfer rollers 422, and an electric charge of the polarity opposite to the polarity of the toner is applied to the rear side, that is, a side of intermediate transfer belt 421 that makes contact with primary transfer rollers 422 whereby the toner image is electrostatically transferred to intermediate transfer belt 421.

Thereafter, when sheet S passes through the secondary transfer nip, the toner image on intermediate transfer belt 421 is secondary-transferred to sheet S. To be more specific, a secondary transfer bias is applied to backup roller 423B, and an electric charge of the polarity identical to the polarity of the toner is applied to the front side, that is, a side of sheet S that makes contact with intermediate transfer belt 421 whereby the toner image is electrostatically transferred to sheet S.

Fixing section 60 includes upper fixing section 60A having a fixing side member disposed on a fixing surface side, that is, a side of the surface on which a toner image is formed, of sheet S, lower fixing section 60B having a rear side supporting member disposed on the rear surface side, that is, a side of the surface opposite to the fixing surface, of sheet S, and the like. The back side supporting member is brought into pressure contact with the fixing side member, whereby a fixing nip for conveying sheet S in a tightly sandwiching manner is formed. Fixing section 60 corresponds to "fixing device" of the embodiment of the present invention.

At the fixing nip, fixing section 60 applies heat and pressure to sheet S on which a toner image has been secondary-transferred to fix the toner image on sheet S. Fixing section 60 is disposed as a unit in fixing part F.

Upper side fixing section 60A includes endless fixing belt 61, heating roller 62 and fixing roller 63, which serve as a fixing side member. Fixing belt 61 is installed in a stretched state between heating roller 62 and fixing roller 63.

Heating roller 62 incorporates a heating source (halogen heater) and applies heat to fixing belt 61. The heating source applies heat to heating roller 62, and as a result, fixing belt 61 is heated.

Fixing roller 63 rotates clockwise when driving section 90 is controlled by control section 100. When fixing roller 63 rotates, fixing belt 61 and heating roller 62 rotate in the clockwise direction to follow the rotation of fixing roller 63. Driving section 90 will be described later.

Lower fixing section 60B includes pressure roller 64 that is the rear side supporting member. Together with fixing belt 61, pressure roller 64 forms a fixing nip for conveying sheet S in a sandwiching manner. Pressure roller 64 is driven into rotation in the counterclockwise direction by control section 100.

Sheet conveyance section 50 includes sheet feeding section 51, sheet ejection section 52, conveyance path section 53 and the like. Three sheet feed tray units 51a to 51c included in sheet feeding section 51 store sheets S (standard sheets, special sheets) discriminated on the basis of the basis weight, the size, and the like, for each type set in advance.

Conveyance path section 53 includes a plurality of pairs of conveyance rollers such as a pair of registration rollers 53a and the like. Sheets S stored in sheet tray units 51a to 51c are output one by one from the uppermost, and conveyed to image forming section 40 by conveyance path section 53. At this time, the registration roller section in which the pair of registration rollers 53a are arranged corrects skew of sheet S fed thereto, and the conveyance timing is adjusted. Then, in image forming section 40, the toner image on intermediate transfer belt 421 is secondary-transferred to one side of sheet S at one time, and a fixing process is performed in fixing section 60. Sheet S on which an image has been formed is ejected out of the image forming apparatus by sheet ejection section 52 including sheet ejection rollers 52a.

Figure 4:
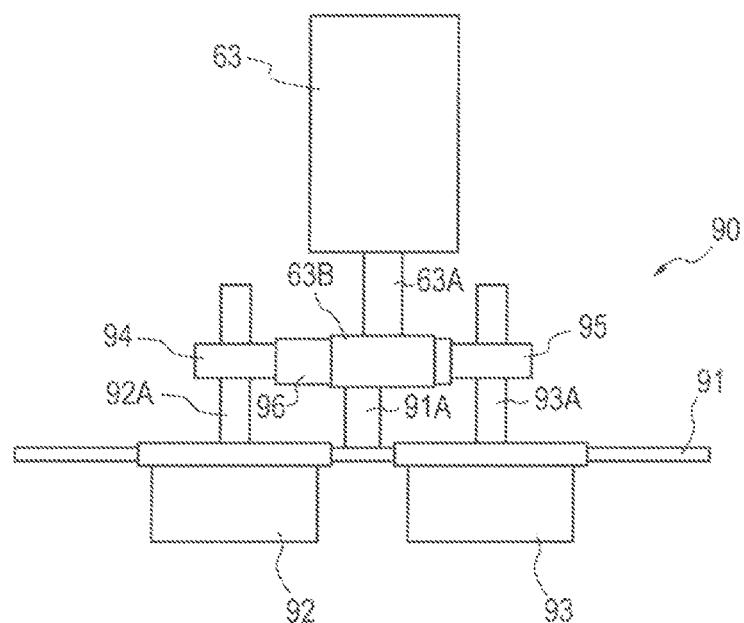
FIG. 4 schematically illustrates a driving section.

Next, details of driving section 90 will be described. FIG. 4 schematically illustrates driving section 90, and FIG. 5 illustrates gears as viewed from the driving source side.

Figure 5:
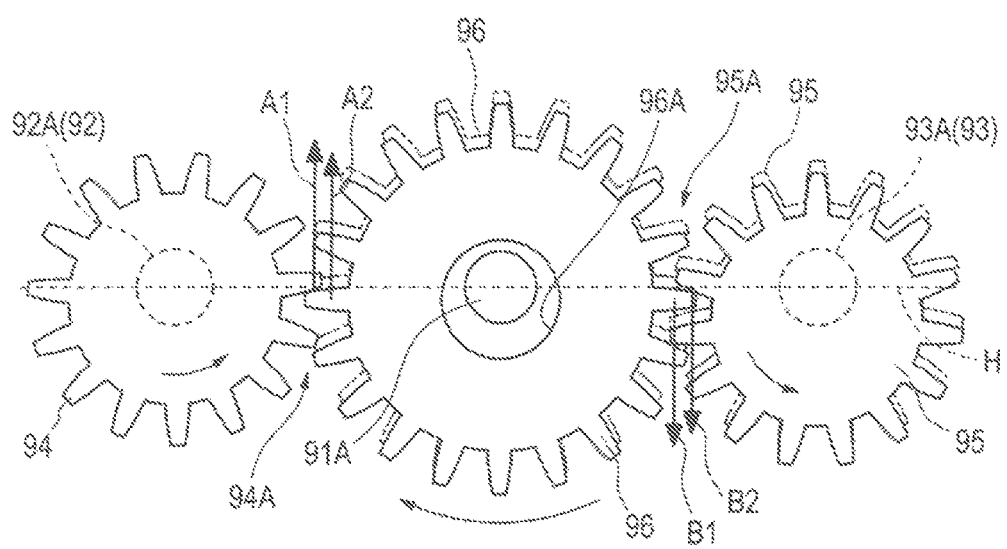
FIG. 5 illustrates gears as viewed from the driving source side.

As illustrated in FIG. 4 and FIG. 5, driving section 90 drives fixing roller 63, and includes substrate 91, first driving source 92, second driving source 93, first gear 94, second gear 95, and third gear 96. Substrate 91 is provided with fixation shaft 91A for pivotally supporting third gear 96.

First driving source 92 and second driving source 93 are commonly-used DC motors, and are fixed to substrate 91, for example. First driving source 92, fixation shaft 91A and second driving source 93 are disposed side by side in this order from the left side in the drawing.

Drive shaft 92A of first driving source 92 is connected with first gear 94, and drive shaft 93A of second driving source 93 is connected with second gear 95. The centers of drive shafts 92A and 93A and fixation shaft 91A are located on line H which is parallel to the horizontal direction in the drawing (see FIG. 5). In other words, the rotation center of first gear 94, the rotation center of second gear 95 and the center of fixation shaft 91A are disposed on a straight line.

Third gear 96 is a gear for transmitting the driving force from first driving source 92 and second driving source 93 to fixing roller 63, and is engaged with first gear 94, second gear 95 and fixation gear 63B connected with shaft 63A of fixing roller 63. Fixation gear 63B corresponds to "load" of the embodiment of the present invention, and driving section 90 and fixation gear 63B correspond to "driving device" of the embodiment of the present invention.

As illustrated in FIG. 5, hole 96A through which fixation shaft 91A is provided is formed at the center of third gear 96. The eccentricity of first gear 94, second gear 95 and third gear 96 is compensated with the diameter of hole 96A. The diameter of hole 96A is greater than a value of the sum of a tolerance for fixation shaft 91A and the diameter of fixation shaft 91A. That is, hole 96A is formed in third gear 96 with a fitting play of fixation shaft 91A.

In addition, the diameter of hole 96A is set based on the eccentric quantity of first gear 94, second gear 95 and third gear 96. To be more specific, the diameter of hole 96A is set to a value which compensates the preliminarily measured eccentric quantity of first gear 94, second gear 95 and third gear 96. For example, the diameter of hole 96A is set to a value enough to allow the maximum eccentricity of first gear 94, second gear 95 and third gear 96, and is, desirably, about two or three times the tolerance for fixation shaft 91A. For example, the diameter of hole 96A is set to 30 to 40 μm when the tolerance for fixation shaft 91A is 10 to 20 μm.

While the diameter of hole 96A is emphasized and fixation shaft 91A is not in contact with the edge of hole 96A in FIG. 5 and so forth for convenience, fixation shaft 91A makes contact with a corresponding portion of the edge of hole 96A according to the position of moved third gear 96 described later.

In addition, in the present embodiment, first gear 94 and second gear 95 have the same size. Therefore, when first driving source 92 and second driving source 93 operate with the same driving force, the driving force transmitted from first gear 94 to third gear 96 and the driving force transmitted from second gear 95 to third gear 96 are equal to each other.

Here, in the case where the gears have no eccentricity, a torque generated at first portion 94A where first gear 94 engages with third gear 96 and a torque generated at second portion 95A where second gear 95 engages with third gear 96 are not varied since the gears do not move, and in turn, the output of third gear 96 is not varied.

In addition, since the rotation center of first gear 94, the rotation center of second gear 95 and the center of fixation shaft 91A are disposed on a straight line, torque A1 is upward along the rotational direction of first gear 94 (see the arrow of first gear 94 in FIG. 5) at first portion 94A, and torque B1 is downward along the rotational direction of second gear 95 (see the arrow of second gear 95 in FIG. 5) at second portion 95A.

Therefore, when driving sources 92 and 93 are operated with the same driving force, the values of torque A1 and torque B1 have the same magnitude in directions opposite to each other, and therefore torque A1 and torque B1 cancel each other. With this configuration, the reactive force due to torque A1 and torque B1 is not generated with respect to third gear 96, and in addition, the position of third gear 96 relative to fixation shaft 91A is not fixed.

Consequently, at third gear 96, the driving force of the sum of the driving force transmitted by first gear 94 and the driving force transmitted by second gear 95, that is, a driving force approximately twice the driving force of one driving source, can be output.

In addition, for example, when second gear 95 has eccentricity, the position of second gear 95 where second gear 95 engages with third gear 96 varies in the vertical direction. When the position varies, the torques generated at first portion 94A and second portion 95A vary depending on the position of second gear 95, and the output of third gear 96 may possibly vary.

However, in the present embodiment, the diameter of hole 96A is greater than the sum of the diameter of fixation shaft 91A and the tolerance for fixation shaft 91A, and therefore, even when second gear 95 is moved under the influence of the eccentricity, third gear 96 moves along with the movement of second gear 95. In the example case illustrated in FIG. 5, third gear 96 moves to the position indicated with the solid line when second gear 95 is located at the position indicated with the solid line, and third gear 96 moves to the position indicated with the chain double-dashed line when second gear 95 is located at the position indicated with the chain double-dashed line.

Since the diameter of hole 96A is set to a value enough to allow the maximum eccentricity of the gears, torque B1 generated at second portion 95A when second gear 95 is located at the position indicated with the solid line and torque B2 generated at second portion 95A when second gear 95 is located at the position indicated with the chain double-dashed line are constant.

In a configuration in which a plurality of gears are engaged with one gear, the total torque of the engagement portions of the gears is constant. In view of this, since torque B1 and torque B2 are constant, torque A1 generated at first portion 94A when second gear 95 is located at the position indicated with the solid line and torque A2 generated at first portion 94A when second gear 95 is located at the position indicated with the chain double-dashed line are also constant. Therefore, even when second gear 95 has eccentricity and the position is varied, the torque generated at portions 94A and 95A is not varied, and the output of third gear 96 is not varied.

Figure 6:
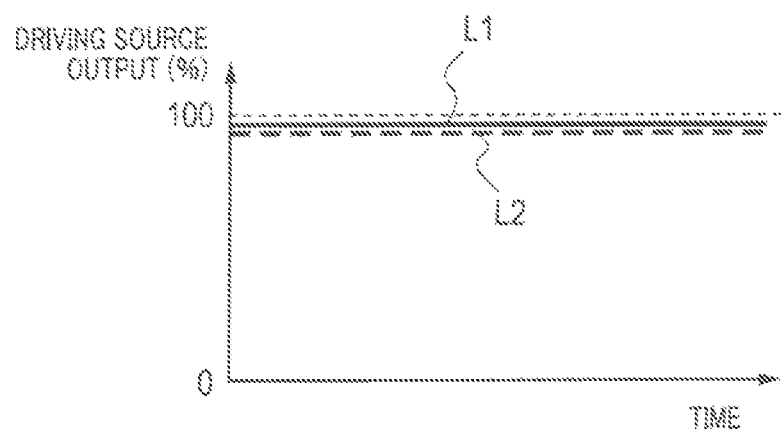
FIG. 6 shows time variations of PWM outputs of the driving sources.

FIG. 6 illustrates the time variation of the PWM (Pulse Width Modulation) outputs of driving sources 92 and 93. As illustrated in FIG. 6, since the torque is not varied at the position of the moved third gear 96, PWM output L1 of first driving source 92 and PWM output L2 of second driving source 93 are not varied during the driving operation, and the outputs are substantially 100%. Therefore, even when the gears have eccentricity, the driving force of the sum of the driving force of first driving source 92 and the driving force of second driving source 93 can be output at third gear 96.

Figure 7:
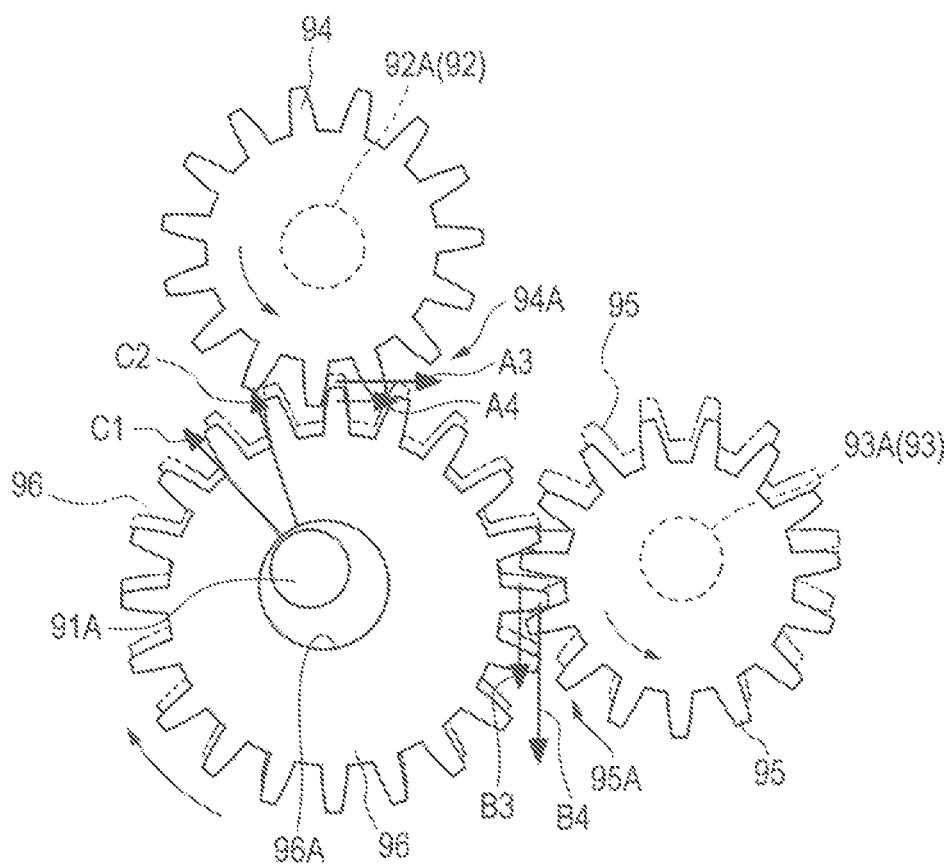
FIG. 7 illustrates a configuration where a first gear is disposed just above a third gear.

Here, a configuration in which first gear 94 is disposed just above third gear 96 as illustrated in FIG. 7 is studied. In this configuration, first gear 94 is disposed at a position where the torque generated at first portion 94A is orthogonal to the torque generated at second portion 95A. For example, in the case where the gears have no eccentricity (or where second gear 95 and third gear 96 are located at the positions indicated with the chain double-dashed line), torque A3 generated at first portion 94A and torque B3 generated at second portion 95A are equal to each other when first driving source 92 and second driving source 93 are equal to each other.

In addition, in this configuration, torque A3 is rightward along the rotational direction of first gear 94 at first portion 94A (see the arrow of first gear 94 in FIG. 7), and torque B3 is downward along the rotational direction of second gear 95 at second portion 95A (see the arrow of second gear 95 in FIG. 7). Since the directions of torque A3 and torque B3 are set such that torque A3 and torque B3 do not cancel each other, reactive force C1 is generated in the direction of FIG. 7 (substantially 45 degrees) at third gear 96 with torque A3 and torque B3.

While the output of third gear 96 is not varied even when reactive force C1 is generated in the case where the gears have no eccentricity, third gear 96 moves from the position of the chain double-dashed line to the position of the solid line along with the movement of second gear 95 from the position of the chain double-dashed line to the position of the solid line in the case where second gear 95 has eccentricity for example. When third gear 96 moves in the above-mentioned manner, the contact position between fixation shaft 91A and the edge of hole 96A is varied, and consequently the direction of reactive force C2 generated at the position of the chain double-dashed line is different from the direction of the reactive force C1.

When the direction of reactive force C2 and the direction of reactive force C1 are different from each other, torque B4 generated at second portion 95A when second gear 95 is located at the position indicated with the solid line is greater than torque B3 generated at second portion 95A when second gear 95 is located at the position indicated with the chain double-dashed line.

In a configuration in which a plurality of gears are engaged with one gear, the total torque of the engagement portions of the gears is constant, and therefore, along with the variation of torque B4, torque A4 generated at first portion 94A is smaller than torque A3 generated at first portion 94A when second gear 95 is located at the position indicated with the chain double-dashed line. Consequently, due to the variation of the torque generated at first portion 94A and second portion 95A, the output of third gear 96 is varied.

Figure 8:
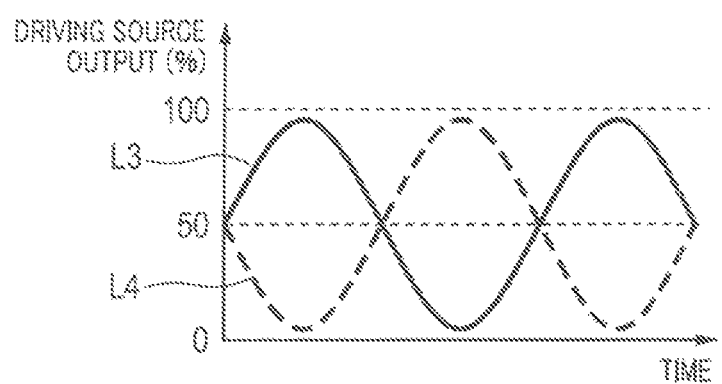
FIG. 8 illustrates time variations of PWM outputs of the driving sources in the configuration illustrated in FIG. 7.

When the torques generated at first portion 94A and second portion 95A vary in the above-mentioned manner, the driving force at first driving source 92 and the driving force at second driving source 93 vary in a wavy fashion. FIG. 8 illustrates the time variation of the PWM outputs of driving sources 92 and 93 in the configuration illustrated in FIG. 7.

For example, as illustrated in FIG. 8, when PWM output L3 of first driving source 92 and PWM output L4 of second driving source 93 are set such that one of PWM output L3 and PWM output L4 is maximized when the other is minimized, the output of third gear 96 is about 50% on average relative to the configuration of FIG. 5. Therefore, it is desirable to dispose the rotation center of first gear 94, the rotation center of second gear 95 and the center of fixation shaft 91A on a straight line.

Figure 9:
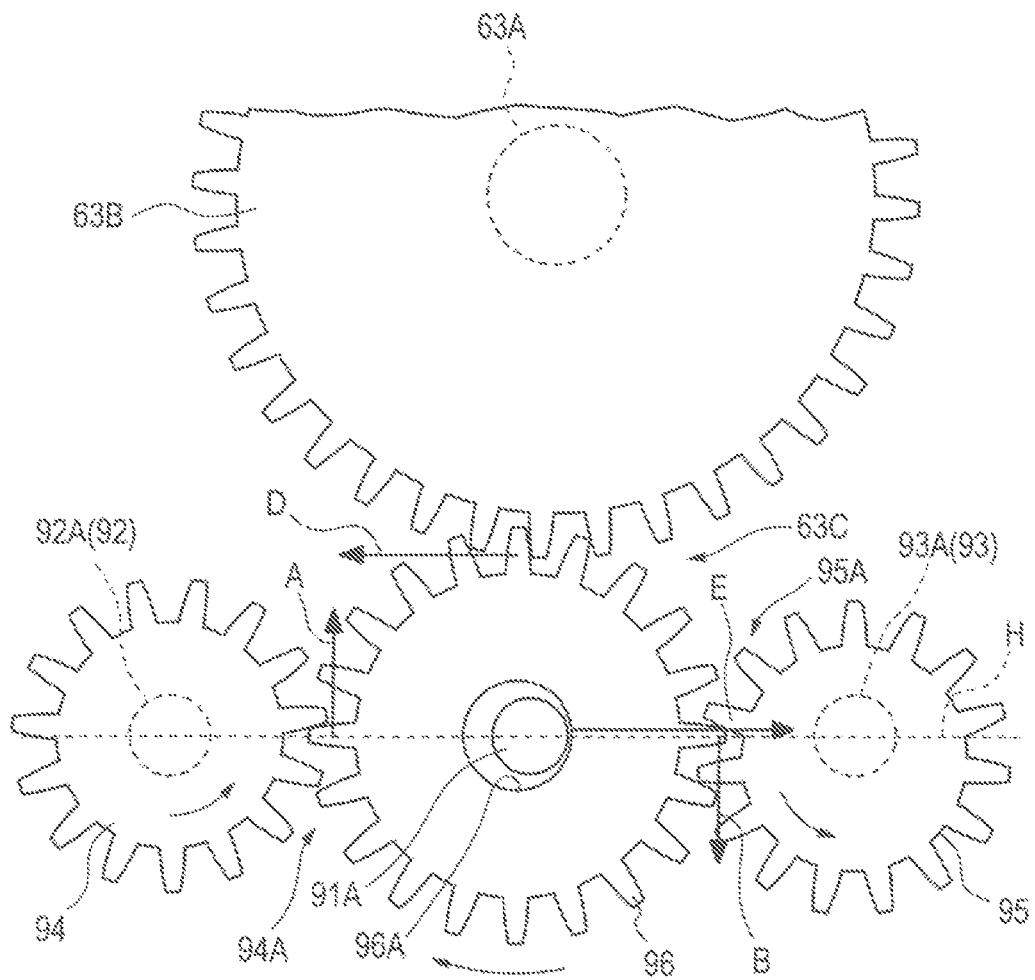
FIG. 9 illustrates a first gear, a second gear, a third gear and a fixation gear as viewed from the driving source side.

In addition, as illustrated in FIG. 9, fixation gear 63B that is engaged with third gear 96 is disposed just above third gear 96. Specifically, fixation gear 63B is disposed at a position where the direction of torque D generated at third portion 63C that is engaged with third gear 96 is orthogonal to the directions of torque A generated at first portion 94A and torque B generated at second portion 95A.

When fixation gear 63B and third gear 96 are engaged with each other, torque D which is leftward in the drawing is generated at third portion 63C, and, with this torque D, reactive force E opposite to torque D is generated at a portion where fixation shaft 91A makes contact with the edge of hole 96A in third gear 96. However, since the directions of torque D and reactive force E are orthogonal to the directions of torque A and torque B, the directions of torque A and torque B are not influenced by torque D and reactive force E, and thus it is possible to prevent fixation gear 63B from interfering with the operation of compensating the eccentricity of third gear 96.

In addition, with the backlash at the gear teeth, fixation gear 63B cancels the operation of compensating the eccentricity of third gear 96, and is not influenced by the operation.

When fixation gear 63B is disposed at a position where torque D generated at third portion 63C is not orthogonal to torques A and B generated at first portion 94A and second portion 95A, that is, a position where torque D generated at third portion 63C is tilted to torque D of FIG. 9, reactive force E is generated in a vertical direction parallel to torques A and B. As a result, the operation of third gear 96 of compensating the eccentricity is hampered. For this reason, it is desirable to dispose fixation gear 63B at a position where torque D is orthogonal to torques A and B.

As described above, image forming apparatus 1 of the present embodiment includes first driving source 92, second driving source 93, first gear 94 to which the driving force is transmitted from first driving source 92, second gear 95 to which the driving force is transmitted from second driving source 93, third gear 96 that engages with first gear 94 and second gear 95, and fixation shaft 91A that pivotally supports third gear 96, fixation shaft 91A being disposed such that the center of fixation shaft 91A, the rotation center of first gear 94 and the rotation center of second gear 95 are disposed on a straight line. Fixation shaft 91A is provided through third gear 96, and hole 96A having a diameter for compensating eccentricity of first gear 94, second gear 95 and third gear 96.

According to the above-mentioned configuration of the present embodiment, the eccentricity of the gears can be compensated with the movement of third gear 96, and even when the gears have eccentricity, high output can be achieved while suppressing variation of the output.

In addition, since the rotation center of first gear 94, the rotation center of second gear 95 and the center of fixation shaft 91A are disposed on a straight line, the torque generated at first portion 94A and the torque generated at second portion 95A cancel each other when the driving forces of the driving sources are equal to each other. Therefore, an output of the sum of the driving forces of the driving sources, that is, an output twice the driving force of one driving source can be ensured.

In addition, since the output is the sum of the driving forces of the driving sources, commonly-used DC motors which are relatively inexpensive and are high-yield may be used as the driving sources. Therefore, it is not necessary to produce a high-output driving source which tends to be a dedicated part and thus production cost for the driving source can be reduced.

In addition, since fixation gear 63B is disposed at a position where torque D is orthogonal to torques A and B, it is possible to prevent fixation gear 63B from interfering with the operation of compensating the eccentricity of third gear 96.

While the driving force is directly transmitted to fixing roller 63 by engaging third gear 96 with fixation gear 63B in the above-mentioned embodiment, the present invention is not limited to this. The driving force may be transmitted to fixing roller 63 through another gear.

Figure 10:
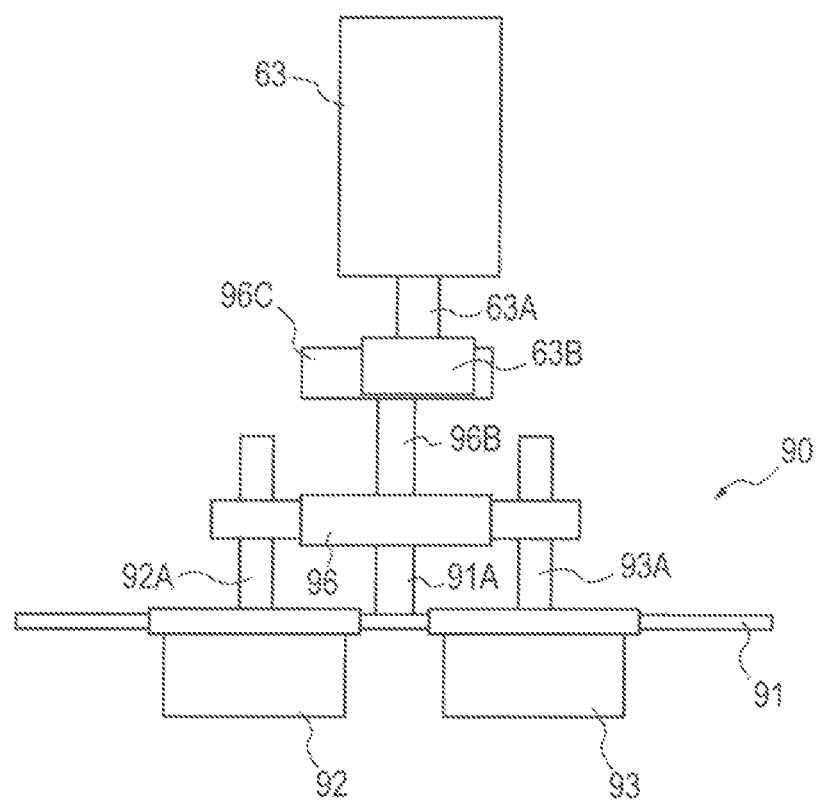
FIG. 10 schematically illustrates a driving section according to modification 1.

For example, as illustrated in FIG. 10, driving section 90 includes, in addition to the above-mentioned gears, shaft 96B extending from the surface opposite to substrate 91 of third gear 96, and fourth gear 96C connected with an end portion of shaft 96B. Fourth gear 96C is engaged with fixation gear 63B.

In this configuration, with the rotation of third gear 96 on which the driving force is exerted, shaft 96B and fourth gear 96C rotate, and thus a driving force is transmitted from fourth gear 96C to fixing roller 63. With this configuration, even when the gears have eccentricity, high output can be achieved while suppressing variation of the output.

Figure 11:
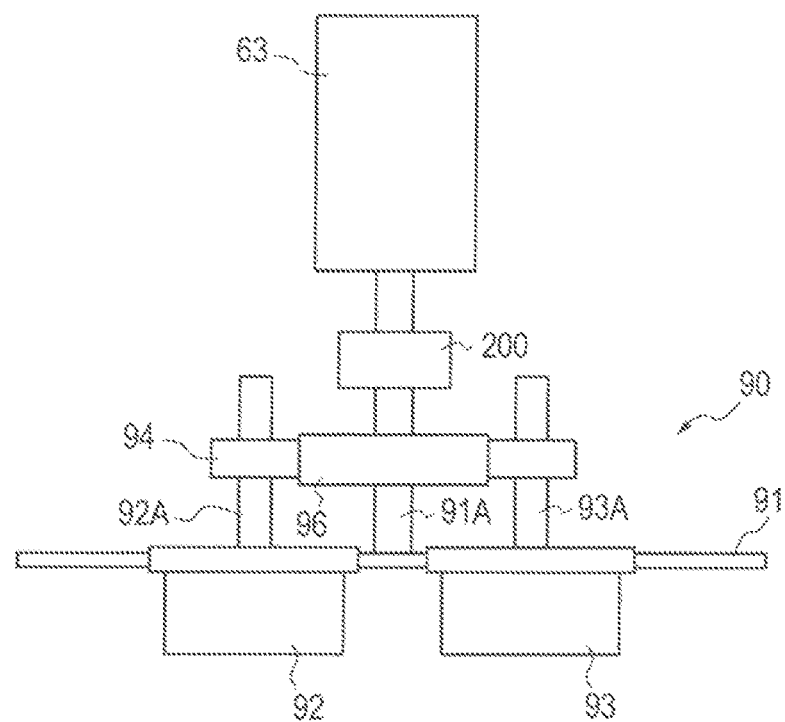
FIG. 11 schematically illustrates a driving section according to modification 2.
Figure 12:
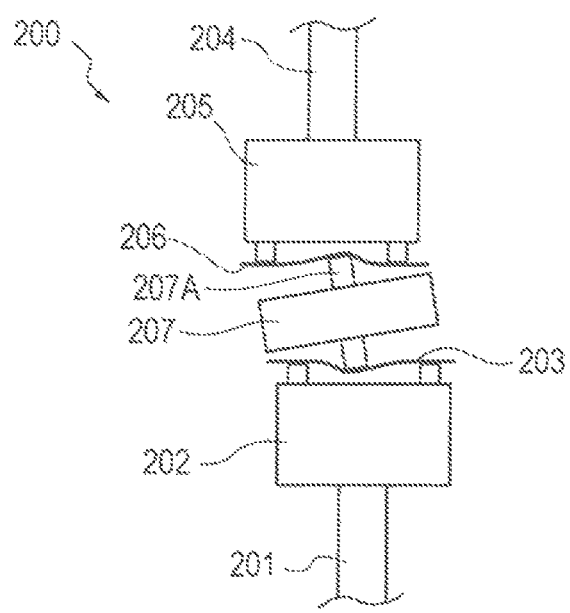
FIG. 12 is an enlarged view of a coupling member.

In addition, it is also possible to adopt a configuration in which third gear 96 and fixing roller 63 are coupled with each other using coupling member 200 to thereby transmit the driving force to fixing roller 63 as illustrated in FIG. 11 and FIG. 12.

Coupling member 200 is, for example, a disk-type coupling, and includes first shaft 201, first hub 202, first disk 203, second shaft 204, second hub 205, second disk 206, and third hub 207.

First shaft 201 extends from the surface opposite to substrate 91 of third gear 96. First hub 202 is connected with an end portion of first shaft 201. First disk 203 is an elastically-deformable thin plate-shaped member, and is provided on the side opposite to first shaft 201 of first hub 202.

Second shaft 204 is a shaft of fixing roller 63. Second hub 205 is connected with an end portion of second shaft 204. Second disk 206 is an elastically-deformable thin plate-shaped member, and is provided on the side opposite to second shaft 204 of second hub 205.

Third hub 207 is disposed between first disk 203 and second disk 206, and includes third shaft 207A for coupling between first disk 203 and second disk 206.

With coupling member 200, for example, even when the positions of third gear 96 and fixing roller 63 are shifted in the horizontal direction in the drawing, first disk 203 and second disk 205 elastically deform, and thus the positional displacement of third gear 96 and fixing roller 63 is compensated. In this configuration, the driving force from third gear 96 is transmitted to fixing roller 63 through coupling member 200. With this configuration, even when the gears have eccentricity, variation in output can be suppressed, and high output can be achieved.

It is to be noted that the coupling of coupling member 200 is not limited to the disk coupling, and may be Oldham coupling, ball coupling, bellows coupling, or gear coupling.

While first driving source 92 and second driving source 93 are DC motors in the above-mentioned embodiment, the present invention is not limited to this, and one of first driving source 92 and second driving source 93 may be a stepping motor for example.

When the output of the stepping motor is set to a high value, positioning accuracy is reduced under the influence of the inertia of the motor. In contrast, with the above-mentioned configuration, the output of driving section 90 can be increased by use of the DC motor while performing highly accurate positioning using the stepping motor. In addition, since the eccentricity of the gear has no influence, it is possible to suppress an excessive load which is applied to the stepping motor side due to the position of the gear having eccentricity, and in turn, it is possible to suppress loss of synchronization of the stepping motor.

In addition, while driving section 90 is used for driving fixing roller 63 in the above-mentioned embodiment, the present invention is not limited to this, and, for example, driving section 90 may be used also for the components of image forming apparatus 1 such as sheet conveyance section 50.

The embodiments disclosed herein are merely exemplifications and should not be considered as limitative. While the invention made by the present inventor has been specifically described based on the preferred embodiments, it is not intended to limit the present invention to the above-mentioned preferred embodiments but the present invention may be further modified within the scope and spirit of the invention defined by the appended claims.

The present invention is applicable to an image forming system composed of a plurality of units including an image forming apparatus. In particular, the present invention is applicable to an image formation system in the field of production print where high productivity is required. When the present invention is applied in that field, the cost for the driving source of high output can be suppressed, and high-output conveyance driving for printing of thick sheets and high speed conveyance can be achieved.

What is claimed is:

1. A driving device comprising:
   a first driving motor;
   a second driving motor;
   a first gear to which a driving force is transmitted from the first driving motor;
   a second gear to which a driving force is transmitted from the second driving motor;
   a third gear that engages with the first gear and the second gear; and
   a fixation shaft that pivotally supports the third gear without rotating, the fixation shaft being disposed such that a center of the fixation shaft, a rotation center of the first gear and a rotation center of the second gear are disposed on a straight line, wherein:
   the fixation shaft is provided through the third gear; and
   a hole having a diameter for compensating eccentricities of the first gear, the second gear and the third gear is formed in the third gear.

2. The driving device according to claim 1, wherein the diameter of the hole is set based on eccentric quantities of the first gear, the second gear and the third gear.

3. The driving device according to claim 1, wherein the third gear is disposed such that a direction of a torque which is exerted on the third gear from a load that transmits a driving force is orthogonal to directions of torques which are exerted on the third gear from the first gear and the second gear.

4. The driving device according to claim 1, wherein the third gear transmits a driving force to a load through a coupling member.

5. The driving device according to claim 1, wherein the first driving motor and the second driving motor are DC motors.

6. The driving device according to claim 1, wherein:
   one of the first driving motor and the second driving motor is a DC motor; and
   the other of the first driving motor and the second driving motor is a stepping motor.

7. A fixing device comprising:
   a first driving motor;
   a second driving motor;
   a first gear to which a driving force is transmitted from the first driving motor;
   a second gear to which a driving force is transmitted from the second driving motor;
   a third gear that engages with the first gear and the second gear; and
   a fixation shaft that pivotally supports the third gear without rotating, the fixation shaft being disposed such that a center of the fixation shaft, a rotation center of the first gear and a rotation center of the second gear are disposed on a straight line, wherein:
   the fixation shaft is provided through the third gear; and
   a hole having a diameter for compensating eccentricity of the first gear, the second gear and the third gear is formed in the third gear.

8. An image forming apparatus comprising:
   a first driving motor;
   a second driving motor;
   a first gear to which a driving force is transmitted from the first driving motor;
   a second gear to which a driving force is transmitted from the second driving motor;
   a third gear that engages with the first gear and the second gear; and
   a fixation shaft that pivotally supports the third gear without rotating, the fixation shaft being disposed such that a center of the fixation shaft, a rotation center of the first gear and a rotation center of the second gear are disposed on a straight line, wherein:
   the fixation shaft is provided through the third gear; and
   a hole having a diameter for compensating eccentricity of the first gear, the second gear and the third gear is formed in the third gear.

9. The driving device according to claim 1, further comprising:
   a fourth gear to which a driving force is transmitted from the third gear, the fourth gear being disposed just above the third gear.

10. The driving device according to claim 1, further comprising:
    a fourth gear to which a driving force is transmitted from the third gear, wherein
    a torque direction generated between the third gear and the fourth gear is orthogonal to a torque direction generated between the second gear and the third gear.

11. The driving device according to claim 10, wherein a torque direction generated between the first gear and the third gear is orthogonal to the torque direction generated between the third gear and the fourth gear.

12. The driving device according to claim 1, further comprising:
- a fifth gear that transmits a driving force to a fourth gear and is connected to the third gear by an extending shaft.

13. The driving device according to claim 4, wherein the coupling member is selected from the group consisting of a disk coupling, an Oldham coupling, a ball coupling, a bellows coupling, and a gear coupling.

14. The driving device according to claim 13, wherein the coupling member is the disk coupling which comprise a first shaft, a first hub, a first disk, a second disk, a second hub and a third hub.

\* \* \* \* \*